United States Patent
Varadarajan et al.

(10) Patent No.: US 11,276,224 B2
(45) Date of Patent: Mar. 15, 2022

(54) METHOD FOR RAY INTERSECTION SORTING

(71) Applicant: Samsung Electronics Co., Ltd., Suwon-si (KR)

(72) Inventors: Keshavan Varadarajan, Austin, TX (US); David Tannenbaum, Austin, TX (US); Srinidhi Padmanabhan, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 16/930,310

(22) Filed: Jul. 15, 2020

(65) Prior Publication Data

US 2021/0327118 A1    Oct. 21, 2021

Related U.S. Application Data

(60) Provisional application No. 63/012,049, filed on Apr. 17, 2020.

(51) Int. Cl.
| | |
|---|---|
| *G06T 15/50* | (2011.01) |
| *G06T 15/06* | (2011.01) |
| *G06T 1/20* | (2006.01) |
| *G06T 15/00* | (2011.01) |

(52) U.S. Cl.
CPC .............. *G06T 15/06* (2013.01); *G06T 1/20* (2013.01); *G06T 15/005* (2013.01)

(58) Field of Classification Search
CPC ....... G06T 15/06; G06T 15/005; G06T 15/80; G06T 15/50; G06T 2200/28; G06T 2215/12; G06T 15/60; G06T 17/005; G06F 9/30036; G06F 15/80; G06F 15/8007

See application file for complete search history.

(56) References Cited

U.S. PATENT DOCUMENTS

| | | |
|---|---|---|
| 7,884,819 B2 | 2/2011 | Kuesel et al. |
| 8,018,457 B2 | 9/2011 | Peterson et al. |
| 8,411,087 B2 | 4/2013 | Wei et al. |
| 9,741,159 B2 | 8/2017 | Hazel |
| 9,996,966 B2 | 6/2018 | Lee et al. |
| 10,366,468 B2 | 7/2019 | Akenine-Moller |
| 10,497,167 B2 | 12/2019 | Shin et al. |
| 2007/0132754 A1* | 6/2007 | Reshetov ................ G06T 15/50 345/419 |

(Continued)

*Primary Examiner* — Hau H Nguyen
(74) *Attorney, Agent, or Firm* — Renaissance IP Law Group LLP (57) ABSTRACT

A system and a method are disclosed for ray tracing in a pipeline of a graphic processing unit (GPU). It is determined whether a ray bounce of a first ray intersects a first primitive that is the closest primitive intersected by the ray bounce. The first ray is part of a first group of rays being processed by a first single-instruction-multiple-data (SIMD) process. The first ray is assigned by a sorting or binning unit to a second group of rays based on the intersection of the first primitive. The second group of rays is processed by a second SIMD process. The first ray is assigned to the second group of rays based on a material identification of the first primitive, an identification of the first primitive intersected by the ray bound of the first ray, a pixel location, and a bounce number of the ray bounce intersecting the first primitive.

20 Claims, 6 Drawing Sheets

(56) References Cited

U.S. PATENT DOCUMENTS

2019/0311531 A1  10/2019  Stich et al.
2020/0051312 A1   2/2020  Muthler et al.
2020/0193681 A1*  6/2020  Saleh ..................... G06T 15/80

* cited by examiner

METHOD FOR RAY INTERSECTION SORTING

CROSS-REFERENCE TO RELATED APPLICATION

This application claims the priority benefit under 35 U.S.C. § 119(e) of U.S. Provisional Application No. 63/012,049, filed on Apr. 17, 2020, the disclosure of which is incorporated herein by reference in its entirety.

TECHNICAL FIELD

The subject matter disclosed herein relates to graphics processing units (GPUs). More specifically, the subject matter disclosed herein relates to a technique for efficiently using material shaders when performing ray tracing.

BACKGROUND

Ray tracing is a technique for rendering objects for viewing as an image that is motivated by the way light works in nature. Ray-tracing helps make a rendered image more photo-realistic. Ray tracing may result in better rendering of shadows, specular highlights, reflections, penumbrae (soft shadows), global illumination, etc.

Based on the DirectX Ray Tracing standard and the Vulkan RT standard, rays are generated from a ray-generation shader. The generated rays invoke a "traceRay" construct that causes a GPU to traverse an acceleration structure to determine whether a ray intersects a primitive. Once an intersection with a primitive has been determined, an any-hit shader may be executed. The GPU determines the primitive that is the closest among all primitives that were determined to be intersected by the ray, and the properties of the closest primitive are used to affect the shading of a specific pixel. That is, the shading of the specific pixel may be determined by an appropriate closest-hit shader program that may be invoked based on the material property of the closest-hit primitive, as evaluated at the point of intersection of the ray to compute the color, which is then used to modify the shading at the specific pixel.

As per the DirectX Ray Tracing specification and the Vulkan RT specification, several rays may be packed into a warp (or wavefront), which is a unit of execution on a GPU shader core. As different rays potentially intersect different primitives with different material shaders, warps and wavefronts tend to exhibit branch divergence, i.e., not all threads execute the same portions of the code, leading to a possible poor utilization of the shader cores. That is, when only a portion of the rays in a warp, or wavefront, are actually executing and the rest remain idle, resources of a GPU are being consumed without actually producing any useful work.

SUMMARY

An example embodiment provides a ray-tracing method that may include: determining by a ray-tracing pipeline of a GPU whether a ray bounce of a first ray intersects a first primitive in which the first ray may be part of a first group of rays being processed by a first single-instruction-multiple-data process; and assigning by a sorting unit of the GPU the first ray to a second group of rays based on the ray bounce of the first ray intersecting the first primitive in which the second group of rays may be processed by a second single-instruction-multiple-data process. In one embodiment, the first primitive may include a closest primitive intersected by the ray bounce of the first ray, and assigning the first ray to the second group of rays may further be based on a material identification of the first primitive, and an identification of the first primitive intersected by the ray bound of the first ray. In another embodiment, the first ray to the second group of rays may be further based on a pixel location, and a bounce number of the ray bounce intersecting the first primitive.

An example embodiment provides a ray-tracing method may include: invoking a ray-generation shader of GPU to generate a first ray that is part of a first group of rays being processed by a first single-instruction-multiple-data-process; determining by a ray-tracing pipeline whether a ray bounce of the first ray intersects a first primitive; sending by the ray-tracing pipeline to a sorting unit of the GPU first metadata relating to the ray bounce of the first ray intersecting the first primitive; and assigning by a sorting unit of the GPU the first ray to a second group of rays based on the first metadata relating to the ray bounce of the first ray intersecting the first primitive in which the second group of rays may be processed by a second single-instruction-multiple-data process. In one embodiment, the first primitive may include a closest primitive intersected by the ray bounce of the first ray, and the first metadata may include a material identification of the first primitive, and an identification of the first primitive intersected by the ray bounce of the first ray. In another embodiment, the first metadata may further include a pixel location, and a bounce number of the ray bounce intersecting the first primitive. In still another embodiment, the ray-tracing method may include: determining by the ray-tracing pipeline whether a ray bounce of a second ray intersects a second primitive, the second ray being part of the second group of rays; sending by the ray-tracing pipeline to the sorting unit second metadata relating to the ray bounce of the second ray intersecting the second primitive; and assigning by the sorting unit the second ray to a third group of rays based on the second metadata in which the third group of rays may be processed by a third single-instruction-multiple-data process.

An example embodiment provides a graphics pipeline of a GPU that may include a ray-generation shader, an intersection shader and a sorting unit. The ray-generation shader may generate a first ray that is part of a first group of rays being processed by a first single-instruction-multiple-data-process. The intersection shader may determine whether a ray bounce of the first ray intersects a first primitive. The sorting unit may receive first metadata relating to the ray bounce of the first ray intersecting the first primitive, and assign the first ray to a second group of rays based on the first metadata in which the second group of rays may be processed by a second single-instruction-multiple-data process. In one embodiment, the first primitive may include a closest primitive intersected by the ray bounce of the first ray, and the first metadata may include a material identification of the first primitive, an identification of the first primitive intersected by the ray bound of the first ray, a pixel location, and a bounce number of the ray bounce intersecting the first primitive. In another embodiment, the intersection shader may further determine whether a ray bounce of a second ray intersects a second primitive in which the second ray may be part of the second group of rays. The sorting unit may further receive second metadata relating to the ray bounce of the second ray intersecting the second primitive, and assign the second ray to a third group of rays based on the second metadata in which the third group of rays may be processed by a third single-instruction-multiple-data process, and the second metadata may include a material identification of the second primitive, an identification of the second primitive intersected by the ray bound of the second ray, a pixel location, and a bounce number of the ray bounce intersecting the second primitive.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth.

The subject matter disclosed herein provides a technique of reassigning ray-intersection processing from one warp (or wavefront) to other warps (or wavefronts) of GPU. A group of rays initially assigned to a particular warp/wavefront is traversed through an acceleration structure to determine objects in a graphical scene that are hit by the rays. Bounce rays may be generated based on the hits of objects by the rays and based on a material property of the hit objects. The bounce rays are traversed through the acceleration structure to determine further hits on objects by the bounce rays. The ray intersections from primary (initial) or secondary (bounce) rays may be reassigned to the other warps based on a material ID for determining a specific material shader (closest-hit), a primitive ID for identifying a specific primitive being intersected, a pixel (x,y) location, and a bounce number for locating information associated with a ray intersection. In one embodiment, the pixel (x,y) location and the bounce number may uniquely identify an intersection for a given ray.

To avoid a possible branch divergence during execution of a closest-hit shader, invocation of the closest-hit shader may be postponed, or delayed, and not invoked as part of the ray-generation process as is traditionally done. Postponing the invocation of the closest-hit shader may result in the ray-generation shader being decoupled from generating the final color of a pixel. Accordingly, ray tracing, as disclosed herein, may be implemented as a separate unit or may be implemented to use a sorting unit or an existing binning infrastructure (if available) on a GPU.

Mobile GPUs traditionally implement full primitive binning prior to rendering, whereas modern desktop GPUs may implement some form of batch-binning in which small batches of primitives may be binned based on the pixels that primitives touch. Binning involves sorting primitives and generating a structure that, for each bin (which typically corresponds to a given rectangular screen-space array of pixels) indicates which primitives contain coverage in each bin. The subject matter disclosed herein may provide an analogous sorting process to classify each of the ray/primitive intersections with respect to various keys, such as (x,y) location, material ID, etc. That is the subject matter disclosed herein may use a sorting unit or a binning unit to sort rays so that the rays needing to execute the same material shader and possibly touching pixels in the same spatial vicinity are run as part of the same warp or run as temporally close together as possible. Thus, the ray-tracing technique disclosed herein reduces as much as possible in a local domain the inefficiency experienced with traditional ray-tracing techniques in which only a portion of the rays in a warp/wavefront material shader are actually executing while the rest remain idle, and resources of a GPU are being consumed without actually producing any useful work. By reordering rays into different warps/wavefronts, material shaders may more efficiently be used.

Figure 1:
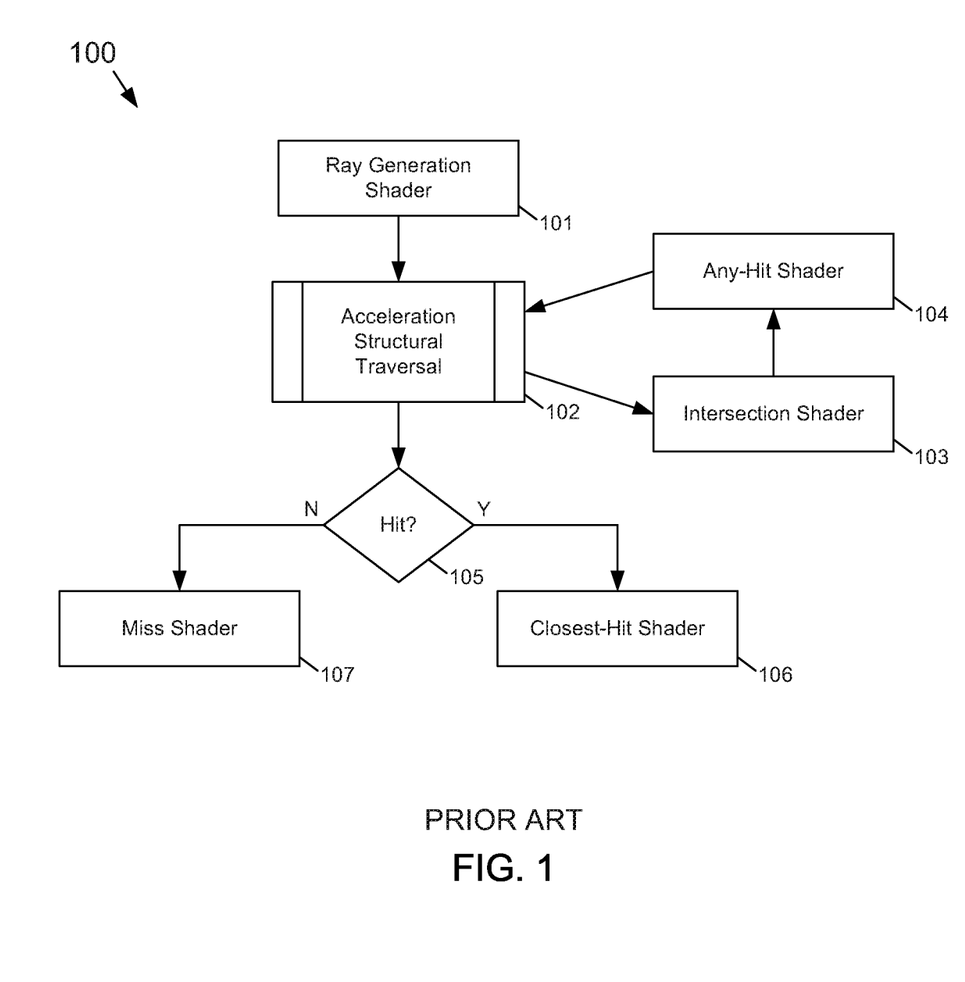
FIG. 1 is an execution control flowchart of a typical ray tracing technique based on the DirectX Ray Tracing and the Vulkan RT standards.

FIG. 1 is an execution control flowchart of a typical ray tracing technique 100 based on the DirectX Ray Tracing and the Vulkan RT standards. At 101, a ray-generation shader is launched on a set of rays having ray origins that are spatially proximate by grouping the rays together as a warp/wavefront. At 102, the ray-generation shader invokes an acceleration structure traversal method (or apparatus). At 103, during the traversal of the acceleration structure, an intersection shader determines whether each of the rays of the warp/wavefront intersect a primitive and, if so, which primitive of the primitives that a ray intersect is the first primitive intersected by the ray. Different rays may intersect different primitives.

When the first primitives that are intersected by each of the rays have been determined, at 104 an any-hit shader is executed, if needed, for all of the rays of the warp/wavefront. The any-hit shader that is executed for all the rays may be the same or may be different based on the intersected primitive. The any-hit shader may be invoked on the function stack of the ray-generation shader. The process of acceleration structure traversal, intersection shader execution, and any-hit shader execution continues for all rays until the primitive that is the closest-hit for each ray has been determined (or until it has been determined that a ray does not intersect any primitive).

If, at 105, a closest primitive that has been hit by a ray of the warp/wavefront has been determined, flow continues to 106 where a closest-hit shader is invoked for each ray that intersects a primitive and the color is evaluated at the point of intersection between the ray and the primitive. If, at 105, a ray is determined not to intersect a primitive, a miss shader is invoked for that ray at 107 to generate such results as "sky" or other ambient values depending on the environment, e.g., a star-scape for a night or space scene, etc. At the completion of the control flow 100, the ray-generation shader returns the final color for the pixel being processed. The color may then be used to appropriately perturb the original color at the pixel being processed.

Each ray of the set could potentially intersect a different primitive in which each primitive has different primitive properties, so there is a possibility of a branch divergence condition occurring among the threads of the warp. Any one of the closest-hit shader, the miss shader, or the ray generation shader may trigger shooting of secondary rays.

Figure 2:
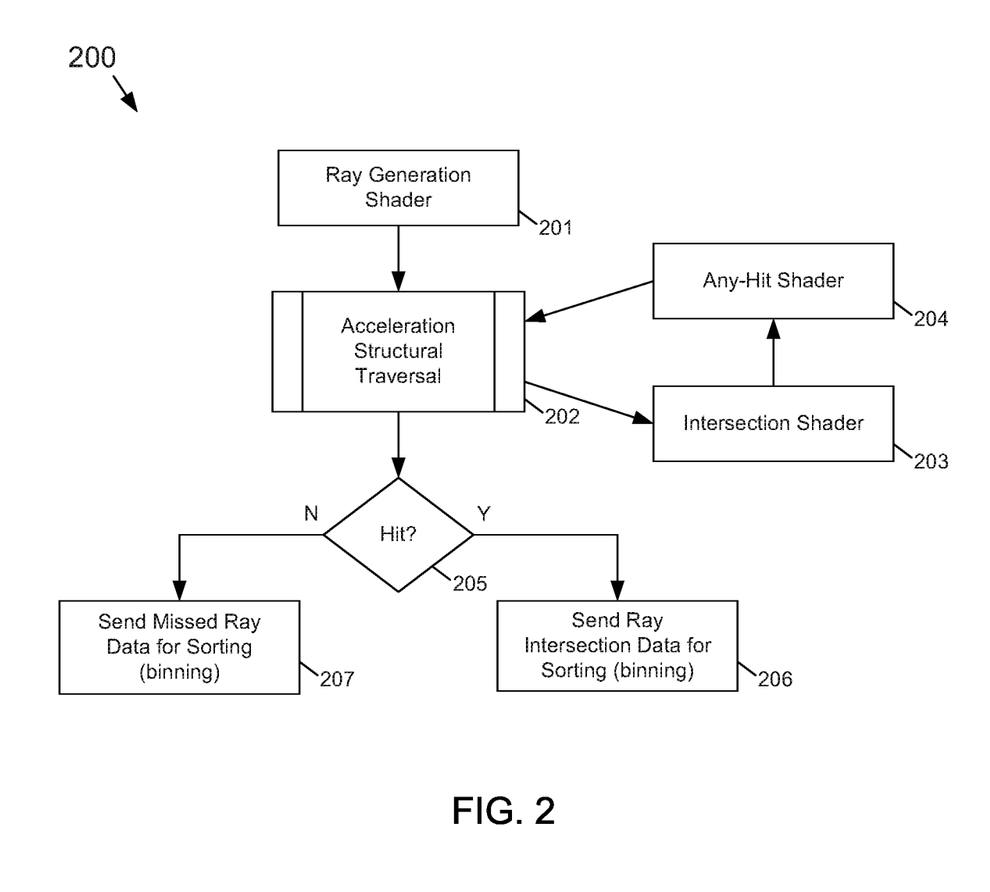
FIG. 2 is an execution control flowchart of an example embodiment of a ray-tracing technique that includes ray-trace sorting according to the subject matter disclosed herein.

FIG. 2 is an execution control flowchart of an example embodiment of a ray-tracing technique 200 that includes ray-trace sorting according to the subject matter disclosed herein. As shown in FIG. 2, execution of ray tracing up to the determination of the closest-hit primitive at 205 proceeds as before. That is, operations 201-205 in FIG. 2 correspond to traditional operations 101-105 in FIG. 1. Additionally, operations 201-207 may be embodied as modules that include any combination of software, firmware and/or hardware configured to provide the functionality described herein in connection with a module.

The result of a trace ray operation is a color value that may be applied to a certain pixel location (x,y). In the case of primary rays—shot from the eye to the screen—(x,y) corresponds to the location (i.e., pixel) on the screen where the ray intersects the screen. In the case of a secondary ray, the pixel location (x,y) corresponds to the pixel origin. In the case of bounce rays, the certain pixel location (x,y) corresponds to the origin of the secondary rays. In other words, the color applied to a pixel may come through a series of bounces (viz. a collection of mirrors can cause a specular highlight on an object even though the object itself is not illuminated by the light directly). In place of traditionally executing a closest-hit shader (at 106 in FIG. 1), at 206 in FIG. 2, the data that would be used by the closest-hit shader may be saved in an attribute storage and the metadata (i.e., material ID, primitive ID, the pixel (x,y) location of the ray/primitive intersection, and bounce number) may be sent to a sorting unit or a binning unit for sorting so that the intersections of primary rays (or secondary rays) may be reassigning to other warps that are then run as part of a same warp or run as temporally close together as possible.

The ray intersections may be sorted at 206 using the 4-tuple of metadata in the order listed as a lexicographic ordering. That is, the material ID metadata may be used to determine which specific material shader (closest-hit) is executed when the primitive corresponding to the material ID metadata is determined as the closest-hit for a ray. The primitive ID metadata identifies a specific primitive that is being intersected, which may be useful in grouping together all accesses to the same primitive, and may potentially lead to better spatial locality during texture access in the material shader. Use of the pixel (x,y) location metadata for sorting may be optional, but may be used to help achieve good spatial locality and temporal locality in the texture cache and/or in the color buffer. The pixel (x,y) location may also be useful for tile-based architectures. The bounce number metadata may be used to locate information associated with the ray intersection (such as, barycentric factors of the point of intersection, ray origin, and ray direction). In one embodiment, the pixel (x,y) location and bounce number together may uniquely identify an intersection for a given ray.

At 207, missed ray data may be sent to a sorting unit or a binning unit for processing. In this case, the miss shader may be considered to be a special case of a closest-hit shader in which the primitive ID is always NULL and the bounce number is zero. The material ID may be set to a default value that refers to the miss shader. All miss shader rays may be grouped together into warps for the same efficiency consideration of avoiding branch divergency. (It is possible for a typical miss shader to have internal divergencies and, thus, sorting miss shader invocations based on ray vector and ray origin may also improve efficiency.)

Some modern GPU architectures may employ a binning unit that increases spatial and temporal locality of accesses to the depth/color buffer and for also minimizing read/write traffic. In architectures that support binning, the hardware structures may be reused and suitably modified to accelerate ray tracing according to the subject matter disclosed herein.

As previously noted, the ray-tracing technique 200 that includes ray-trace sorting in FIG. 2 has been decoupled from generation of the final color output of the pixel. Thus, the ray-generation shader 201 may be responsible only for sending intersection data or miss data to a sorting unit. The final color data may be available after rays have been reassigned to other groups (warps/wavefronts) of rays and after all closest-hit shaders have been executed by the reassigned groups of rays.

A closest-hit shader may utilize existing graphics structures to optimize the ray tracing functionality because the ray-generation shader 200 has been decoupled from the generation of the color output. A closest-hit shader may be performed after 206 in FIG. 2, and may include the following operations. Some (or all) of the ray intersections may be collected and sorted based on the criteria described above. Warps/wavefronts may be created with rays that have the same material ID. Multiple warps/wavefronts may be created if more ray intersection points are present than the capacity of warp. The data may be sent to a color buffer (or tile buffer) unit for writing to memory. Blending may potentially be performed in the color buffer unit. Alternatively, blending may be performed in the shader core and the color buffer unit may only write the data to memory. If, for example, the color perturbation expressions are relatively less complex, an existing Color Render Operations (CROP) unit may be capable of handling to blend the color obtained from a ray with a pixel color that the ray perturbs. If the color perturbation expressions are relatively more complex, then the color perturbation may be performed within the closest-hit shader and the color output written to the color buffer. In this case, the color computed during a previous pass (if any) may be loaded as a texture.

Figure 3:
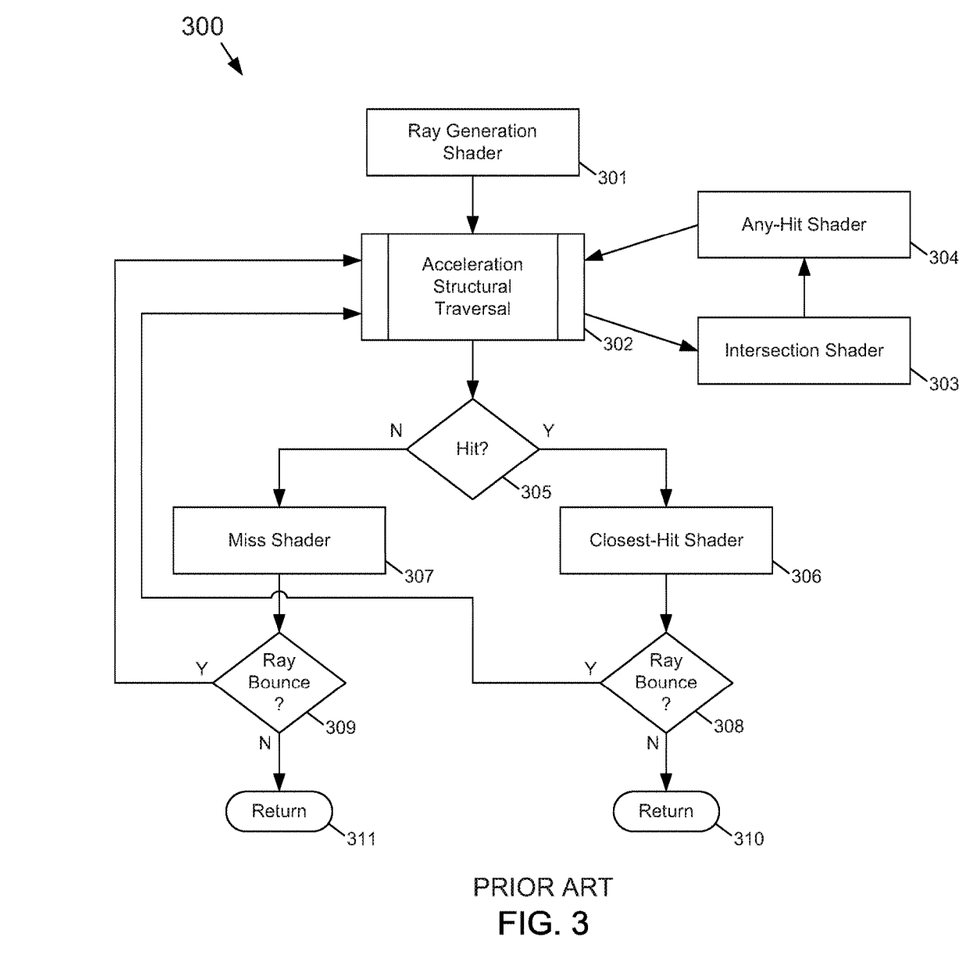
FIG. 3 is an execution control flowchart of a typical ray tracing technique that supports generation of secondary rays based on the DirectX Ray Tracing and the Vulkan RT standards.

FIG. 3 is an execution control flowchart of a typical ray tracing technique 300 that supports generation of secondary rays based on the DirectX Ray Tracing and the Vulkan RT standards. The DirectX Ray Tracing and Vulkan RT standards both support generation of secondary rays from the miss shader (107 in FIG. 1) and closest-hit shader (106 in FIG. 1). Operations 301-307 of FIG. 3 correspond to operations 101-107 of FIG. 1. After invoking the closest-hit shader at 306, or the miss shader at 307, it is determined whether there is a ray bounce at 308 and 309, respectively. If there is a ray bounce at either 308 or 309, flow respectively returns to the acceleration structure traversal at 302. If there is no ray bounce at either 308 or 309, flow respectively continues to 310 or 311 to return from the ray-generation process. It should be noted that the ray-generation process, as per the DirectX Ray Tracing and the Vulkan RT standards, may lead to recursive calls to the acceleration structure traversal, which may in turn call the miss shader or the closest-hit shader.

The ray-tracing technique that includes ray-trace sorting, as disclosed herein, however, bounced ray determination is performed after the closest-hit shader or miss shader has been executed, which happens much later than in a traditional ray-tracing approach. The later execution of the closest-hit shader or the miss shader may result in a recursion loop that is much longer, but may be potentially shortened by running only portions of the closest-hit shader (or the miss shader) that determine whether to create a secondary ray without evaluating color. Determination of whether to bounce a secondary ray is typically based on the material property and a compiler may be modified to create a ray-bounce shader from the closest-hit and miss shaders in which a ray-bounce shader may be a lightweight closest-hit shader. As used herein, the term "lightweight closest-hit shader" refers to a shader that only makes the determination of whether a bounce ray is needed or not by only considering a portion, but not all, of the material properties, thereby allowing for less processing at this point when all that is needed is to determine the bounce ray (or rays). Any calculations not leading to his result are not included. Thus, the technique disclosed herein provides color is not evaluated when a secondary ray is created.

Figure 4:
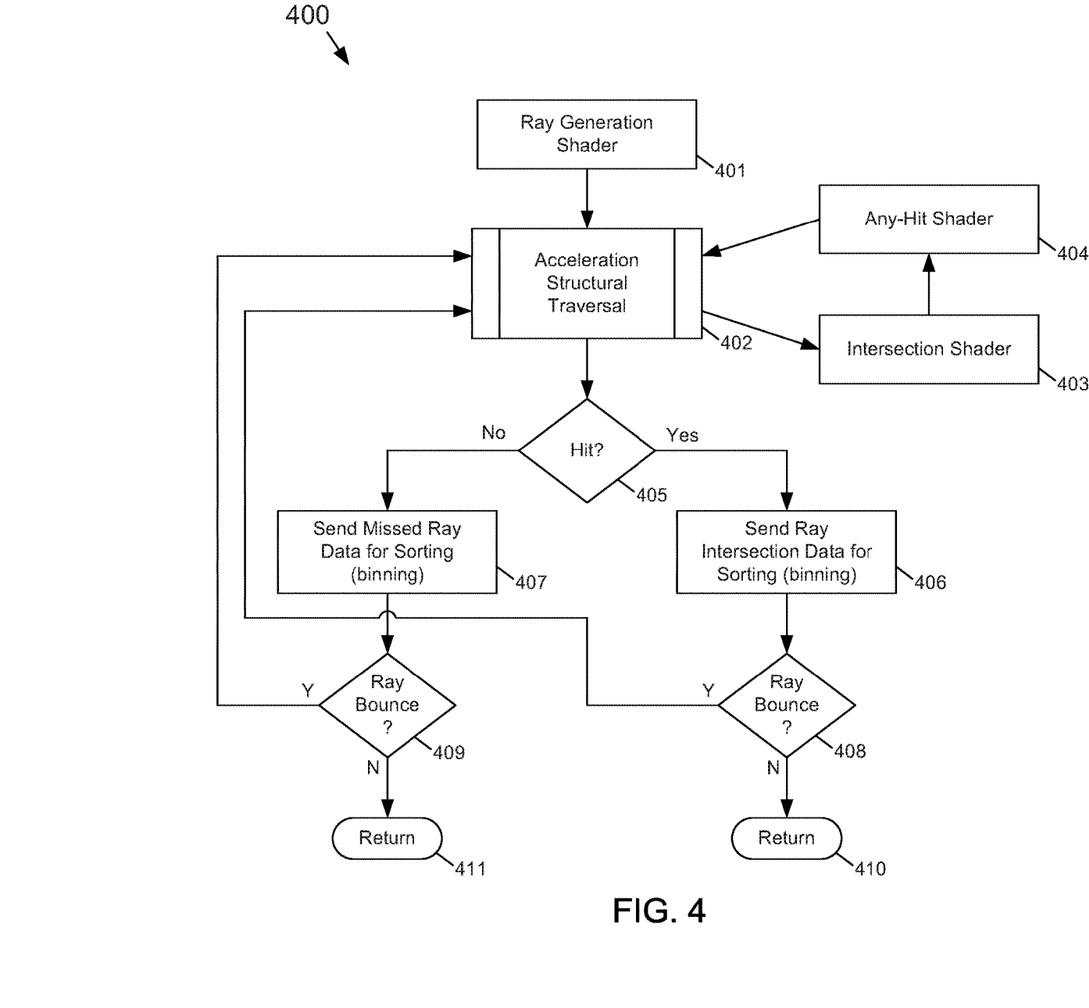
FIG. 4 is an execution control flowchart of an example embodiment of a ray-tracing technique that includes ray-trace sorting and secondary ray generation according to the subject matter disclosed herein.

FIG. 4 is an execution control flowchart of an example embodiment of a ray-tracing technique 400 that includes ray-trace sorting and secondary ray generation according to the subject matter disclosed herein. Execution of ray tracing up to the determination of the closest-hit primitive (i.e., operations 401-405) is as indicated in operations 201-205 of FIG. 2. Additionally, operations 401-409 may be embodied as modules that include any combination of software, firmware and/or hardware configured to provide the functionality described herein in connection with a module.

At 406, the data that would be used by the closest-hit shader may be saved in an attribute storage and the metadata may be sent to a sorting unit or a binning unit for sorting, similar to the operation at 206 in FIG. 2. At 406 in FIG. 4, the data that would be used by the closest-hit shader may be saved in an attribute storage and the metadata (i.e., material ID, primitive ID, the pixel (x,y), and bounce number may be sent to a sorting unit or a binning unit for sorting so that the intersections of primary rays (or secondary rays) may be reassigning to other warps that are then run as part of a same warp or run as temporally close together as possible. At 407, a miss shader may be invoked, similar to operation 207 in FIG. 2.

After sending ray intersection data for sorting at 406 or after sending missed ray data for sorting at 407, it may be determined whether there is a ray bounce at 408 and 409, respectively. If so, flow returns to the acceleration structure traversal at 402. If not, flow respectively continues to 410 or 411 to return from the ray-generation process.

In FIG. 4, the ray bounce stages (operations 408 and 409) are indicated as returning to the acceleration traversal operation at 402. A recursive function-call mechanism may be used to process ray bounces. Alternatively, information may be returned to the ray-generation shader 401 if function recursion is not supported by the GPU on which the ray-generation shader 401 is run. It should also be noted that execution of the ray tracing process disclosed herein is completely independent of any stage of pixel rendering.

The ray-tracing technique with ray-trace sorting disclosed herein (FIGS. 2 and 4) may be implemented in Immediate Mode Rendering (IMR) architectures (such as used in desktops) that provide some form of primitive batch binning. The material ID, primitive ID, pixel (x,y), and bounce number metadata may be sent to a batch binner (or a batch-binning structure that includes a spatial-sorting structure) for sorting. The attributes of the ray intersection may be sent to an attribute store (which may be referred to as the parameter cache on AMD architectures). When the batch is full, the intersections in the batch may be sorted and used to construct warps. The warps of closest-hit shaders may be completed and the color values are sent to the color buffer. At any moment, one batch of intersections may be binned while another batch of intersections may be executing the closest-hit shaders.

In a Tile Based Rendering (TBR) architecture in which a full binner is implemented, the metadata from the ray-generation shader 200 or 400 may be sent to the binner. The following 6-tuple may be sorted by the binner: (tileID, material ID, prim ID, tile_X, tile_Y, bounce #). The 6-tuple may not be conceptually different from the general 4-tuple described above. The 6-tuple re-arranges the (x,y) coordinates to separate tile coordinates or ID (which may be different ways to represent the same information) from the x and y offsets within the tile. The tileID may be moved to the beginning of the 6-tuple because all rendering to the color buffer may only be done within a tile. The binner creates streams and outputs the data structures along with the attribute information to memory. Once all ray generation has been completed (using the ray bounce shaders described above), the ray bin data structures may be traversed and the closest-hit shaders for each of these intersections may be executed, and the color information may be sent to the tile buffer. The colors may be blended in a CROP unit or may be blended in the shader.

In one embodiment, an inline ray-tracing technique may perform ray tracing in a manner that is similar to the ray-tracing techniques described in connection with FIGS. 2 and 4. That is, inline ray tracing may be invoked from any shader and, as the name of the technique variation suggests, may be invoked inline in any current shader. In such an implementation, multiple shaders, such as a ray-generation shader, a closest-hit shader, etc., are usually not present. All of the functionality (provided in one example embodiment by code) that may be used to generate rays, perform intersection and post-intersection shading are all "inlined" into a single shader. Additionally, each of the materials that are to be shaded after an intersection may be listed as part of an if-else ladder.

An inline ray tracer may exhibit a ray-divergence issue. To address such a ray-divergence issue, the inline ray-tracing technique disclosed herein stops the shader at the point when the material shaders would begin processing. At this stopping point, the shader may invoke a ray-intersection test, and if a ray intersection is identified, the details (i.e., the metadata) of the ray intersection are sent to a binner for sorting and reassignment to another warp/wavefront, as described in connection with the ray-tracing techniques of FIGS. 2 and 4.

The if-else structure processed subsequent to the ray-intersection test may be split into one or more shaders. If multiple shaders are implemented, then each shader may contain functionality (provided in one example embodiment by code) for one material. If only one shader is available, then all of the if-else functionality may be included in the shader. Since the material shaders are executed after sorting ray-intersections, however, no branch divergence would be expected because all the ray-intersections have the same material ID.

Figure 5:
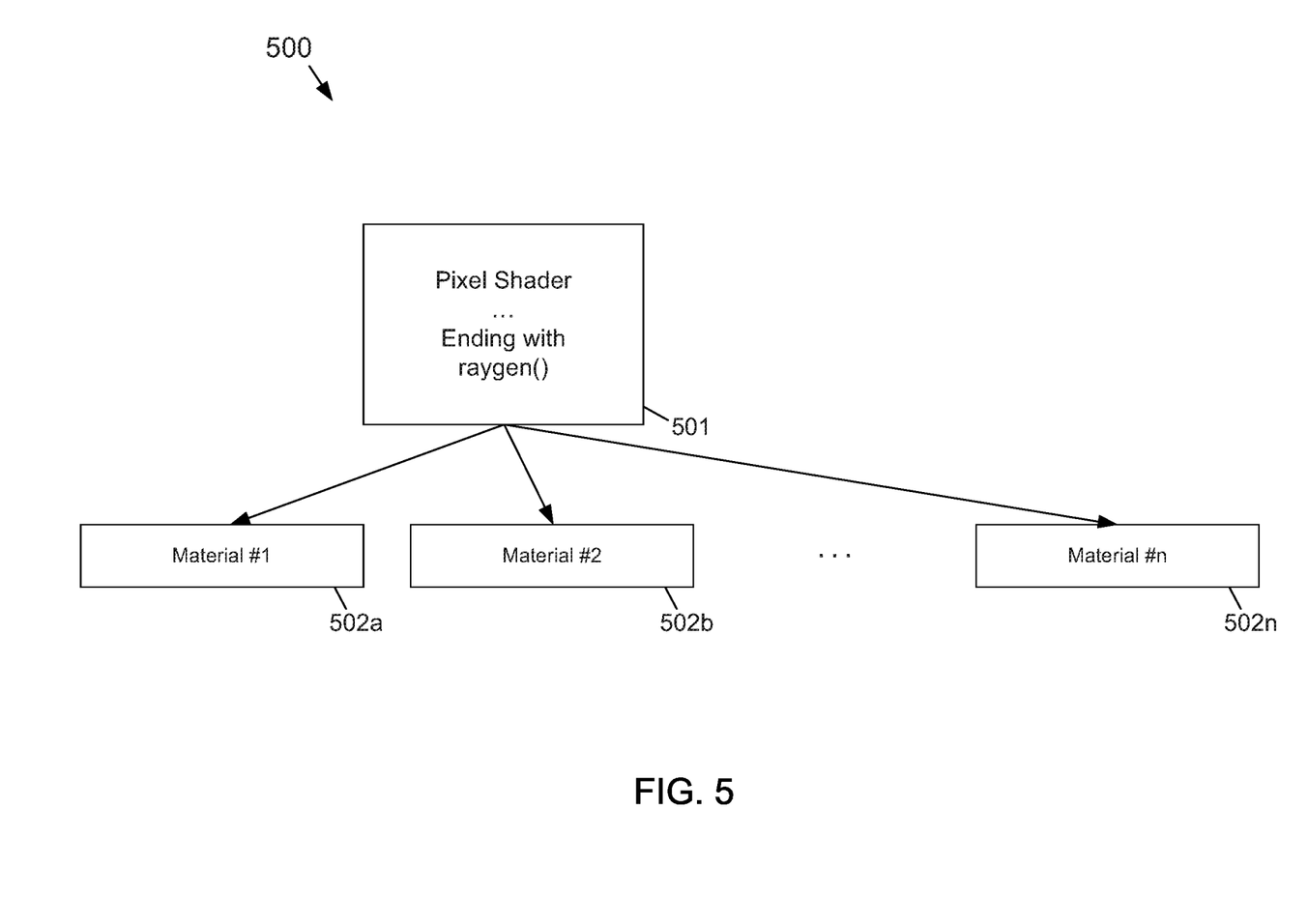
FIG. 5 is an execution control flowchart of an example embodiment of part of an inline ray-tracing technique according to the subject matter disclosed herein.

FIG. 5 is an execution control flowchart of an example embodiment of part of an inline ray-tracing technique 500 according to the subject matter disclosed herein. In particular, the inline ray-tracing technique 500 in FIG. 5 depicts a pixel shader 501 that includes a ray generation function (i.e., a raygen( ) function). The pixel shader 501 may invoke one or more material shaders 502a-502n in which one shader 502 is invoked per material. The pixel shader 501 and the material shaders 502a-502n may be embodied as modules that include any combination of software, firmware and/or hardware configured to provide the functionality described herein in connection with a module.

Figure 6:
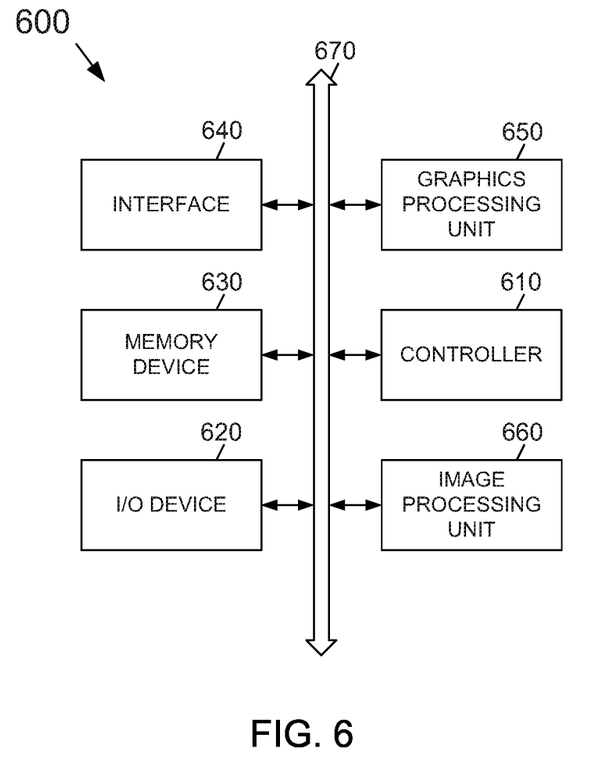
FIG. 6 depicts an electronic device that may include a GPU that provides a ray-tracing technique that includes ray-trace sorting according to the subject matter disclosed herein.

FIG. 6 depicts an electronic device 600 that may include a GPU that provides a ray-tracing technique that includes ray-trace sorting according to the subject matter disclosed herein. Electronic device 600 may be used in, but not limited to, a computing device, a personal digital assistant (PDA), a laptop computer, a mobile computer, a web tablet, a wireless phone, a cell phone, a smart phone, a digital music player, a wireline or wireless electronic device, a heads-up display, and a display for an automotive application. The electronic device 600 may include a controller 610, an input/output device 620 such as, but not limited to, a keypad, a keyboard, a display, a touch-screen display, a camera, and/or an image sensor, a memory 630, an interface 640, a GPU 650, and an imaging processing unit 660 that are coupled to each other through a bus 670. The controller 610 may include, for example, at least one microprocessor, at least one digital signal processor, at least one microcontroller, or the like. The memory 630 may be configured to store a command code to be used by the controller 610 or a user data.

Electronic device 600 and the various system components of electronic device 600 may include a GPU that provides a ray-tracing technique that includes ray-trace sorting according to the subject matter disclosed herein. The interface 640 may be configured to include a wireless interface that is configured to transmit data to or receive data from a wireless communication network using a RF signal. The wireless interface 640 may include, for example, an antenna, a wireless transceiver and so on. The electronic system 600 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A ray-tracing method, comprising:
   determining by a ray-tracing pipeline of a graphics processing unit (GPU) that a ray bounce of a first ray intersects a first primitive, the first ray being part of a first group of rays being processed by a first single-instruction-multiple-data process, and the ray bounce of the first ray comprising a first bounce number that provides information associated with ray direction of the intersection of the first primitive; and
   assigning by a sorting unit of the GPU the first ray to a second group of rays based on the ray bounce of the first ray intersecting the first primitive, the second group of rays being processed by a second single-instruction-multiple-data process.

2. The ray-tracing method of claim 1, wherein the first primitive comprises a closest primitive intersected by the ray bounce of the first ray, and
   wherein assigning the first ray to the second group of rays is further based on a material identification of the first primitive, and an identification of the first primitive intersected by the ray bounce of the first ray.

3. The ray-tracing method of claim 2, wherein assigning the first ray to the second group of rays is further based on a pixel location, and the first bounce number of the ray bounce intersecting the first primitive.

4. The ray-tracing method of claim 3, further comprising: determining by the ray-tracing pipeline that a ray bounce of a second ray intersects a second primitive, the second ray being part of the second group of rays, and the ray bounce of the second ray comprising a second bounce number that provides information associated with ray direction of the intersection of the second primitive; and assigning by the sorting unit the second ray to a third group of rays based on the ray bounce of the second ray intersecting the second primitive, the third group of rays being processed by a third single-instruction-multiple-data process.

5. The ray-tracing method of claim 4, further comprising sending by the ray-tracing pipeline to the sorting unit, ray-intersection information relating to the ray bounce of the first ray intersecting the first primitive.

6. The ray-tracing method of claim 1, wherein the method is part of an inline ray-tracing technique.

7. The ray-tracing method of claim 1, wherein the first group of rays comprises a first warp or a first wavefront, and the second group of rays comprises a second warp or a second wavefront.

8. The method of claim 1, wherein the second group of rays comprises spatially proximate rays, and the second group of rays comprises spatially proximate rays.

9. A ray-tracing method, comprising:
invoking a ray-generation shader of a graphics processing unit (GPU) to generate a first ray that is part of a first group of rays being processed by a first single-instruction-multiple-data-process;
determining by a ray-tracing pipeline that a ray bounce of the first ray intersects a first primitive, the ray bounce of the first ray comprising a bounce number that provides information associated with ray direction of the intersection of the first primitive;
sending by the ray-tracing pipeline to a sorting unit of the GPU first metadata relating to the ray bounce of the first ray intersecting the first primitive; and
assigning by a sorting unit of the GPU the first ray to a second group of rays based on the first metadata relating to the ray bounce of the first ray intersecting the first primitive, the second group of rays being processed by a second single-instruction-multiple-data process.

10. The ray-tracing method of claim 9, wherein the first primitive comprises a closest primitive intersected by the ray bounce of the first ray, and
wherein the first metadata comprises a material identification of the first primitive, and an identification of the first primitive intersected by the ray bounce of the first ray.

11. The ray-tracing method of claim 10, wherein the first metadata further comprises a pixel location, and the first bounce number of the ray bounce intersecting the first primitive.

12. The ray-tracing method of claim 11, further comprising:
determining by the ray-tracing pipeline that a ray bounce of a second ray intersects a second primitive, the second ray being part of the second group of rays, and the ray bounce of the second ray comprising a second bounce number that provides information associated with ray direction of the intersection of the first primitive;

sending by the ray-tracing pipeline to the sorting unit second metadata relating to the ray bounce of the second ray intersecting the second primitive; and
assigning by the sorting unit the second ray to a third group of rays based on the second metadata, the third group of rays being processed by a third single-instruction-multiple-data process.

13. The ray-tracing method of claim 9, wherein the method is part of an inline ray-tracing technique.

14. The ray-tracing method of claim 9, wherein the first group of rays comprises a first warp or a first wavefront, and the second group of rays comprises a second warp or a second wavefront.

15. The method of claim 9, wherein the first group of rays comprises spatially proximate rays, and the second group of rays comprises spatially proximate rays.

16. A graphics pipeline, comprising:
a ray-generation shader of a graphics processing unit (GPU) that generates a first ray that is part of a first group of rays being processed by a first single-instruction-multiple-data-process;
an intersection shader that determines that a ray bounce of the first ray intersects a first primitive, the ray bounce of the first ray comprising a first bounce number that provides information associated with ray direction of the intersection of the first primitive; and
a sorting unit that receives first metadata relating to the ray bounce of the first ray intersecting the first primitive, and assigns the first ray to a second group of rays based on the first metadata, the second group of rays being processed by a second single-instruction-multiple-data process.

17. The graphics pipeline of claim 16, wherein the first primitive comprises a closest primitive intersected by the ray bounce of the first ray, and
wherein the first metadata comprises a material identification of the first primitive, an identification of the first primitive intersected by the ray bounce of the first ray, a pixel location, and the first bounce number of the ray bounce intersecting the first primitive.

18. The graphics pipeline of claim 17, wherein the intersection shader further determines that a ray bounce of a second ray intersects a second primitive, the second ray being part of the second group of rays, and the ray bounce of the second ray comprising a second bounce number that provides information associated with ray direction of the intersection of the second primitive, and
wherein the sorting unit further receives second metadata relating to the ray bounce of the second ray intersecting the second primitive, and assigns the second ray to a third group of rays based on the second metadata, the third group of rays being processed by a third single-instruction-multiple-data process, and the second metadata comprising a material identification of the second primitive, an identification of the second primitive intersected by the ray bounce of the second ray, a pixel location, and a bounce number of the ray bounce intersecting the second primitive.

19. The graphics pipeline of claim 16, wherein the graphics pipeline is performing an inline ray-tracing technique.

20. The graphics pipeline of claim 16, wherein the first group of rays comprises a first warp or a first wavefront, and the second group of rays comprises a second warp or a second wavefront.

* * * * *